Patented Sept. 25, 1923.

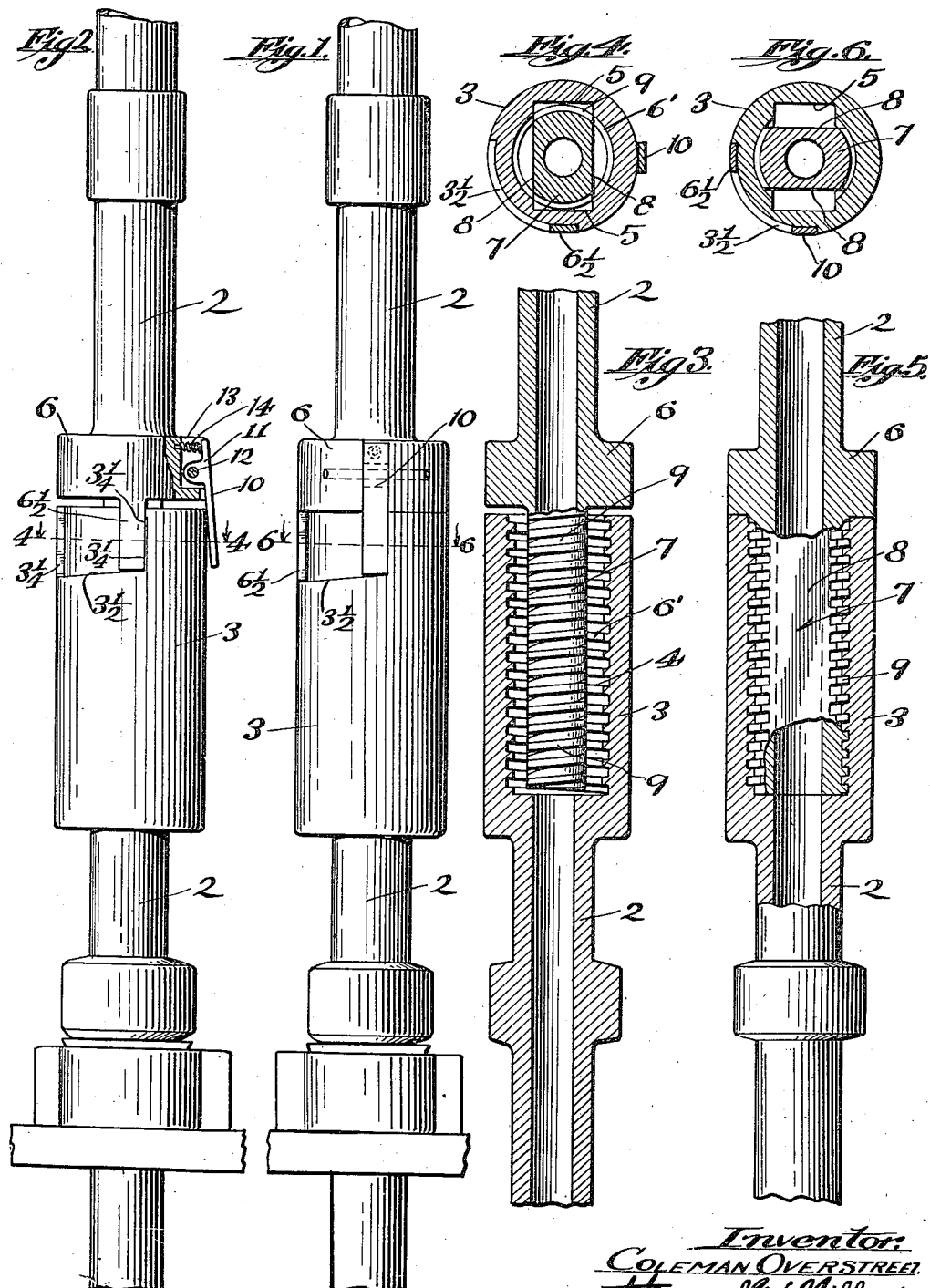
Sept. 25, 1923.
C. OVERSTREET
COUPLING
Filed July 21, 1922
1,469,009

1,469,009

UNITED STATES PATENT OFFICE.

COLEMAN OVERSTREET, OF KERTO, CALIFORNIA.

COUPLING.

Application filed July 21, 1922. Serial No. 576,528.

*To all whom it may concern:*

Be it known that I, COLEMAN OVERSTREET, a citizen of the United States, residing at Kerto, in the county of Kern and State of California, have invented new and useful Improvements in Couplings, of which the following is a specification.

This invention relates to couplings and more particularly to rod and tube couplings, and especially to couplings for facilitating connection of deep well drilling strings.

It is an object of the present invention to provide a form of coupling that will enable the quick attachment and disconnection of two contiguous members of the string of pipes, casings or rods, and a further object is to provide means for latching the elements in connected relation and enabling the quick unlatching for separation when necessary.

Other objects and advantages will be made manifest in the following specification of an embodiment of the invention illustrated in the accompanying drawings, in which—

Figure 1 is a side elevation showing the latching means in front view.

Fig. 2 is a side elevation showing the parts connected and partially broken away and indicating the latch in tripped position.

Fig. 3 is a longitudinal section showing the complementary parts as arranged preparatory to being interlocked.

Fig. 4 is a cross section on line 4—4 of Fig. 2.

Fig. 5 is a section and partial side elevation showing the parts interlocked and latched.

Fig. 6 is a cross section on line 6—6 of Fig. 1.

The device of the present invention involves a male and socket members each having complementary toothed or threaded means whereby when the one member is inserted into the complementary socket member and then these members are relatively rotated, the complementary threads become interengaged and lock the parts against longitudinal movement.

In the present case the invention is incorporated in the form of a tubular drill rod, each section 2 of which is provided at one end with an enlarged head 3 internally chambered to form a socket 4, and diametrically opposite sides of the socket are longitudinally grooved at 5 thus interrupting peripheral teeth or threads 6 extending from the mouth of the socket 4 to a suitable distance in the socket.

One end of each of the drill rods 2 is also provided with a shoulder or flange 6, and below this extends a shank part 7 which has diametrically opposite flat faces 8—8 forming a substantially rectangular shank, the thickness of which is slightly less than the width of the grooves or channels 5 provided in the socket part 3 of a contiguous rod end. The narrow edges of the shank 7 are transversely threaded or toothed at 9 so as to match the concave threads 6 of the socket part 3, and, therefore, the flattened shank may be readily slipped into the channels 5 of the socket, and when the one member is turned relatively to the other, the complementary teeth or threads pass into one another and the members are held against longitudinal movement.

It is desirable to provide a simple and practical means for locking the parts against rotation after they have been interlocked until it is desired to separate the same.

A simple form of locking means is shown as including a latch lever 10 having a lateral lug 11 mounted on a pivot pin 12 arranged in a cavity 13 provided therefor in one side of the flange 6 of a rod member. The latch lever 10 is actuated in one direction by a spring 14 which tends to thrust the other end of the latch lever against a contiguous surface of the head or socket 3. This latter is provided with a peripheral groove or recess 3½ having longitudinally extending shoulders 3¼, and when the flange 6 carrying the latch lever 10 is rotated in the assembly of the parts, the latch is adapted to snap automatically into the recess 3½ so as to turn against one of the shoulders thereof and hold the parts against rotation.

A fixed dog or lug 6½ extends longitudinally from the end face of the flange 6 and this slides longitudinally into the mouth of the recess 3½ when the members are assembled, and the recess 3½ is of such length as to permit the movement of the dog 6 peripherally in the socket 3 while the threads or teeth are being interlocked or registered. As the dog 6½ engages a shoulder 3¼, for instance, then the latch lever 10 moves into register with a shoulder 3¼ and slips down into the recess 3½. This results in the locking of the members by the dogs 6½ and the latch lever 10 engaging contiguous the shoulders of the recess. To disconnect the parts it is only necessary to press out the latch lever 10 so that it will clear the shoulder 3¼ and then rotate the parts sufficiently to disengage the threads and thereafter the parts may be longitudinally separated.

From the above it will be seen that I have provided an extremely simply quick acting means for connecting and disconnecting pipe and rod elements and have eliminated the time necessary in the connection when standard threaded means are utilized.

Further embodiments, modifications and changes may be resorted to within the spirit of the invention as here claimed.

What is claimed is:

1. A coupling means comprising, in combination with members that are to be connected end to end, male and female complementary parts and which parts are provided with complementary teeth, the teeth of one of the parts being interrupted to permit the rapid longitudinal insertion of the other part and to engage when the parts are rotated, and means for locking the parts in interlocked position to prevent rotation relatively, the male member having a stop dog engageable with a complementary stopping shoulder of the female part and having a spring latch to engage the female part.

2. A coupling device comprising members to be longitudinally connected, one of said members having a socket portion and the other having an extended shank portion, interrupted circular teeth in the socket permitting the rapid telescopic insertion of the said shank, teeth formed upon said shank to engage the teeth in the socket, means for locking the parts in interengaged position to prevent relative rotation, said means comprising an automatic latching member and a stop dog both on the shank member and engageable with a complementary stop on the socket member.

3. A coupling device comprising members to be longitudinally connected, one of said members having a socket portion and the other having an extended shank portion, interrupted circular teeth in the socket permitting the rapid telescopic insertion of the said shank, teeth formed upon said shank to engage the teeth in the socket, means for locking the parts in interengaged position to prevent relative rotation, said means comprising an automatic latching member the socket member having a recessed outer face, and a stop dog associated with the shank member and engageable with a complementary stop on the socket member, said dog and said latching member entering the said recess and co-operating to prevent rotation of the parts relatively.

4. A coupling device comprising members to be longitudinally connected, one of said members having a socket portion with a peripherally recessed end wall and the other member having an extended, threaded, flattened shank portion, interrupted circular teeth in the socket permitting the telescopic insertion of the shank, the shank member having a flange provided with a projecting dog telescopic and sweeping in the said recess, and a spring latch, on the said flange, adapted to snap into the said recess when the members are assembled and then rotated.

5. A coupling device comprising members to be longitudinally connected, one of said members having a socket portion with a peripherally recessed end wall and the other member having an extended, threaded, flattened shank portion, interrupted circular teeth in the socket permitting the telescopic insertion of the shank, the shank member having a flange provided with a projecting dog telescopic and sweeping in the said recess, and a spring latch, on the said flange, adapted to snap into the said recess when the members are assembled and then rotated, the dog engaging one end wall and the latch the other end wall of the recess to prevent rotation of the parts.

6. A coupling device comprising members to be longitudinally connected, one of said members having a socket portion with a peripherally recessed end wall and the other member having an extended, threaded, flattened shank portion, interrupted circular teeth in the socket permitting the telescopic insertion of the shank, the shank member having a flange provided with a projecting dog telescopic and sweeping in the said recess, and a spring latch, on the said flange, adapted to snap into the said recess when the members are assembled and then rotated, said dog and latch extending in parallel relation.

In testimony whereof I have signed my name to this specification.

COLEMAN OVERSTREET.